United States Patent
Braunheim

(10) Patent No.: US 9,671,309 B2
(45) Date of Patent: Jun. 6, 2017

(54) DRAINAGE APPARATUS

(71) Applicant: Mahle International GmbH, Stuttgart (DE)

(72) Inventor: Michael Braunheim, Goeppingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/829,380

(22) Filed: Aug. 18, 2015

(65) Prior Publication Data

US 2016/0054193 A1     Feb. 25, 2016

(30) Foreign Application Priority Data

Aug. 19, 2014   (DE) .................. 10 2014 216 409

(51) Int. Cl.
| | |
|---|---|
| *G01M 3/28* | (2006.01) |
| *F02M 37/22* | (2006.01) |
| *F16K 31/06* | (2006.01) |
| *F01M 11/03* | (2006.01) |
| *B01D 35/16* | (2006.01) |

(52) U.S. Cl.
CPC ............ *G01M 3/28* (2013.01); *F02M 37/221* (2013.01); *F16K 31/06* (2013.01); *B01D 35/16* (2013.01); *F01M 11/03* (2013.01); *Y10T 137/2577* (2015.04); *Y10T 137/27* (2015.04); *Y10T 137/88054* (2015.04)

(58) Field of Classification Search
CPC ........ B01D 17/02; B01D 17/12; B01D 21/30; B01D 21/302; B01D 36/003; B01D 36/006; B01D 36/04; B01D 35/16; Y10T 137/2577; Y10T 137/27; Y10T 137/88054; G01M 3/28; F02M 37/221; F01M 11/03; F16K 31/06
USPC .... 135/557; 210/90, 97, 112, 134, 136, 299, 210/313, 513, 799; 137/614.2, 115.02, 137/87.02
See application file for complete search history.

(56) References Cited

U.S. PATENT DOCUMENTS 2,815,036 A * 12/1957 De Matteo ................ F15B 1/02
                                                            137/120
4,628,881 A * 12/1986 Beck ................... F02D 41/3836
                                                            123/446

(Continued)

FOREIGN PATENT DOCUMENTS

| DE | 20217601 U1 | 4/2004 |
|---|---|---|
| DE | 102004046887 A1 | 3/2006 |

(Continued)

OTHER PUBLICATIONS

European Search Report for App. No. EP15180679 dated Jan. 14, 2016.

(Continued)

*Primary Examiner* — William McCalister
(74) *Attorney, Agent, or Firm* — Fishman Stewart PLLC

(57) ABSTRACT

A drainage apparatus for a filter device may include a housing and a solenoid valve arranged in the housing. A non-return valve may be arranged downstream the solenoid valve. A pressure sensor may be arranged between the solenoid valve and the non-return valve. The pressure sensor may be configured for pressure sensing in a chamber disposed between the solenoid valve and the non-return valve.

19 Claims, 1 Drawing Sheet

(56) References Cited

U.S. PATENT DOCUMENTS

| | | | | |
|---|---|---|---|---|
| 5,568,825 A | * | 10/1996 | Faulk | E03B 7/071 137/486 |
| 5,799,688 A | * | 9/1998 | Yie | B05B 1/3046 137/505.13 |
| 8,431,028 B2 | * | 4/2013 | Anderson | B01D 17/00 210/112 |
| 2010/0096304 A1 | * | 4/2010 | Ganswein | F02M 37/221 210/86 |
| 2011/0011807 A1 | * | 1/2011 | Micke | B01D 29/114 210/744 |
| 2011/0088800 A1 | * | 4/2011 | Core | B01D 36/005 137/613 |
| 2011/0147290 A1 | * | 6/2011 | Braunheim | B01D 36/005 210/172.1 |
| 2011/0174717 A1 | * | 7/2011 | Braunheim | B01D 36/008 210/251 |
| 2011/0186501 A1 | * | 8/2011 | Braunheim | B01D 29/114 210/232 |
| 2012/0031824 A1 | * | 2/2012 | Braunheim | B01D 36/005 210/185 |
| 2012/0193300 A1 | | 8/2012 | Anderson et al. | |
| 2015/0107681 A1 | * | 4/2015 | Killeen | F17D 3/00 137/12 |
| 2016/0054193 A1 | * | 2/2016 | Braunheim | F16K 31/06 137/544 |

FOREIGN PATENT DOCUMENTS

| | | |
|---|---|---|
| DE | 102006041212 A1 | 3/2008 |
| DE | 102007039661 A1 | 3/2008 |
| DE | 102009052301 A1 | 5/2011 |
| WO | WO-2011/022659 A2 | 2/2011 |
| WO | WO-2011/041659 A1 | 4/2011 |

OTHER PUBLICATIONS

English Abstract for DE102006041212A1.
English Abstract for DE102004046887A1.
English abstract provided for DE-10217601.
English abstract for DE-102007039661.
English abstract for DE-102009052301.

* cited by examiner

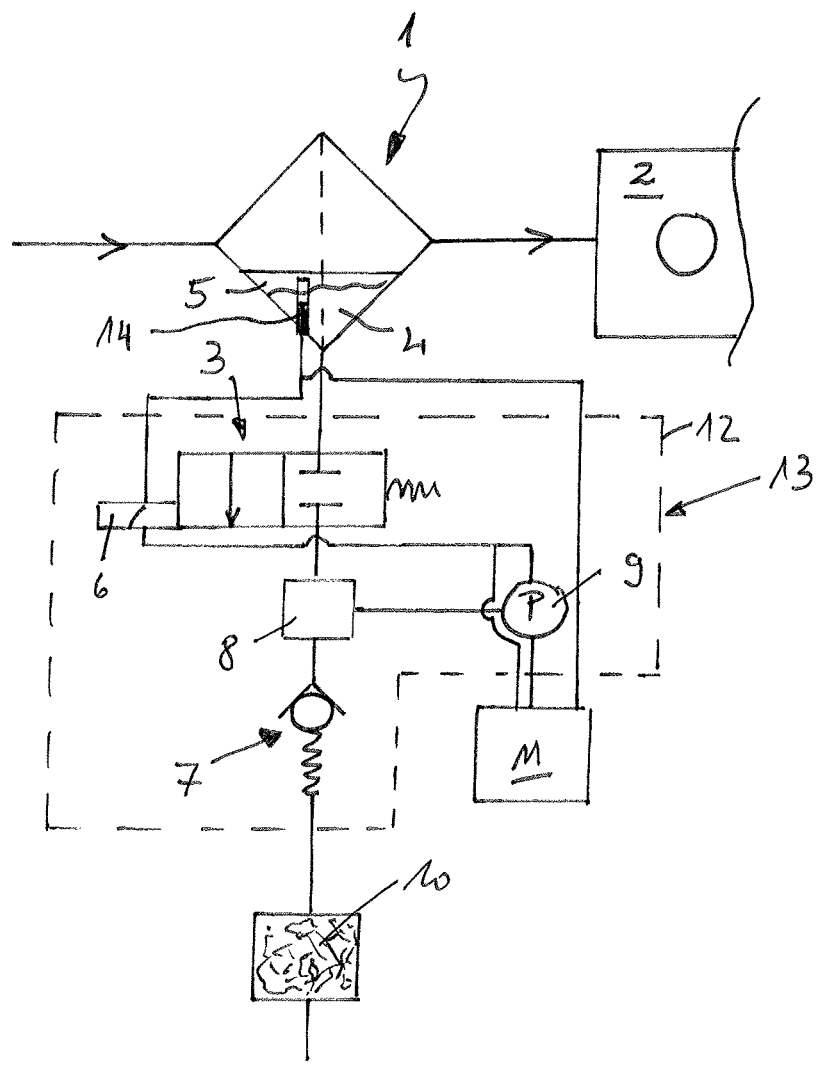

DRAINAGE APPARATUS

CROSS-REFERENCE TO RELATED APPLICATIONS

This application claims priority to German Patent Application No. 10 2014 216 409.5, filed Aug. 19, 2014, the contents of which are hereby incorporated by reference in its entirety.

TECHNICAL FIELD

The present invention relates to a drainage apparatus, particularly for a filter apparatus of an internal combustion engine. The invention also relates to a filter apparatus for an internal combustion engine with a drainage apparatus of this type and also a method for detecting a possible leak in such a drainage apparatus.

BACKGROUND

A generic drainage apparatus with a housing and a solenoid valve is known from DE 202 17 601 U1. In this case, a second solenoid valve is arranged downstream of the first solenoid valve, wherein both solenoid valves can block an associated outlet opening by means of a movable valve body in each case. The solenoid valves, which are connected downstream of one another, should in particular make it possible to drain separated liquid against a differential pressure.

A filter apparatus with a drainage apparatus is known from WO 2011/022659 A2.

In modern fuel modules, for frictionless operation, the separated water is initially collected in a water collection chamber of the fuel module or fuel filter, and for the most part drained into the environment via an additional adsorption filter, for example an activated carbon filter. As the drainage of the separated water constitutes a highly relevant procedure for the environment, currently two solenoid valves are always connected in series, in order to be able to ensure that if one solenoid valve fails, no fuel is inadvertently drained into the environment.

However, in the case of known drainage apparatuses or filter apparatuses with two solenoid valves connected downstream of one another, the comparatively complicated and therefore also expensive design thereof is disadvantageous.

SUMMARY

The present invention is therefore concerned with the problem of specifying an improved or at least alternative embodiment for a drainage apparatus of the generic type, which overcomes the disadvantages known from the prior art in particular.

This problem is solved according to the invention by means of the subjects of the independent claims. Advantageous embodiments of the invention are the subject of the dependent claims.

The present invention is based on the general idea, in the case of a drainage apparatus for a filter apparatus of an internal combustion engine in particular, of not connecting two solenoid valves downstream of one another in series, as known previously from the prior art, but rather of only providing a single solenoid valve, downstream of which a non-return valve is arranged. In this case, a pressure sensor is provided between the solenoid valve and the non-return valve, which is constructed for pressure sensing in a chamber located between the solenoid valve and the non-return valve. The idea in the case of the drainage apparatus according to the invention is therefore to monitor a solenoid valve by means of a pressure sensor for the proper operation thereof or the proper functioning thereof. In this case, the sensor is located on the unpressurised side, i.e. downstream of the solenoid valve, wherein the solenoid valve and the pressure sensor can be realised separately. In an embodiment realised separately in this manner, the pressure sensor can be arranged at any desired position between the solenoid valve and the non-return valve or else in a drainage line between the two valves. As long as the drainage apparatus is constructed as a unit, it offers considerable simplifications during installation, maintenance and possible replacement. Instead of the hitherto comparatively expensive second solenoid valve, an inexpensive and constructively simple non-return valve can then be used, wherein the leak-proofness of the solenoid valve is determined by means of the pressure sensor. Namely, a certain pressure is built up between the non-return valve and the solenoid valve during the drainage procedure, which pressure can be detected using the pressure sensor. When the solenoid valve is closed, the pressure that has built up is normally reduced owing to a valve-specific leak at the valve seat of the non-return valve, so that after closing the solenoid valve, it is possible to deduce by means of the pressure sensor and a detected pressure drop that the solenoid valve closes reliably. If the pressure sensor does not detect a pressure drop, then it is to be assumed that the leak occurring at the solenoid valve essentially corresponds to the leak specific to the non-return valve, from which it can be deduced that the solenoid valve does not close in a reliably sealed manner. If even a pressure rise is to be recorded, then it can be deduced therefrom that the leak at the solenoid valve is larger than at the non-return valve and as a result, the solenoid valve is clearly leaking.

A control apparatus for opening and closing the solenoid valve is expediently provided. A control apparatus of this type can periodically open the solenoid valve for example, in particular insofar as the same downwardly closes a water collection chamber of a fuel filter. In order to be able to prevent corrosion in an internal combustion engine, the water portion, which is always present in fuel, is separated to the greatest extent possible, which takes place for example in the previously described fuel filter by means of what is known as a coalescer or a water separator. The separated water usually collects in this case below the filter element in a water collection chamber and is periodically drained from the same into the environment. Of course, drainage does not usually take place directly in this case, but rather via an adsorption filter, for example an activated carbon filter, in which hydrocarbon portions still present in the separated water can be adsorbed. The periodic opening and closing of the solenoid valve and therefore the periodic emptying of the water collection chamber in this case takes place by means of the control apparatus, wherein a signal for opening the solenoid valve can be generated by a water level sensor in the water collection chamber, for example.

In a further advantageous embodiment of the solution according to the invention, a leak detection apparatus is provided, which is connected to the pressure sensor and is constructed for analysing the signals thereof. It is possible by means of the leak detection apparatus, to detect the pressure level prevailing between the solenoid valve and the non-return valve after the opening and closing of the solenoid valve and—as described above—investigating the reliable functioning of the solenoid valve by means of the same. In this case, if the leak detection apparatus does not determine a pressure drop in this case, then it is to be assumed that there is a leak in the solenoid valve and the leak detection apparatus generates a fault notification or a warning signal.

The present invention is further based on the general idea of specifying a method for detecting a possible leak of a drainage apparatus, in which the solenoid valve is initially opened at least partially. When the solenoid valve opens, a pressure increase is detected by the pressure sensor, wherein the motor control or the leak detection apparatus does not generate a fault or warning notification for the signals "solenoid valve open" and "pressure increase". Subsequently, the solenoid valve is closed, wherein after the closing of the solenoid valve, the pressure between the solenoid valve and the non-return valve slowly drops owing to microleaks at the valve seat of the non-return valve. It is advantageous if in this case, the chamber between the solenoid valve and the non-return valve is comparatively small, the walls are ideally stiff and there are no spaces, in which air bubbles can remain. The chamber would therefore be filled with liquid completely, wherein a small increase or a small drop in the liquid quantity present in the chamber directly effects an associated pressure increase or pressure drop. The leak in ml/min, which is required for reducing the pressure between the solenoid valve and the non-return valve in a time period t, in this case defines the lower limit of leak detection in ml/min. Larger leaks at the solenoid valve in this case lead to a pressure increase in the chamber between the solenoid valve and the non-return valve and in this case indicate leaking of the solenoid valve. If neither a pressure drop nor a pressure increase is measured, it can be assumed that the leak at the non-return valve corresponds to that at the solenoid valve, so that the liquid quantity in the chamber remains essentially constant. In this case, measuring is not carried out continuously, but rather only after the predefined time period t, which can be from 0 to 60s for example.

The closing function of the solenoid valve can therefore be monitored in a simplified manner by means of the pressure sensor due to the drainage apparatus according to the invention, the filter apparatus according to the invention and the method according to the invention, and as a result the previously required double valve construction is superfluous, in order to ensure that the solenoid valve closes properly and no fuel can inadvertently escape into the environment. Using the drainage apparatus according to the invention, the entire valve construction therefore becomes less expensive and safety remains constant.

Further important features and advantages of the invention result from the sub-claims, from the drawing and from the associated description of the figures on the basis of the drawing.

It is to be understood that the previously mentioned features and the features which are still to be mentioned in the following, can be used not only in the respectively specified combination, but also in other combinations or alone, without departing from the context of the present invention.

BRIEF DESCRIPTION OF THE DRAWINGS

A preferred exemplary embodiment of the invention is illustrated in the drawing and is explained in the description below.

The single FIG. 1 shows a schematic construction of a filter apparatus according to the invention with a drainage apparatus according to the invention.

DETAILED DESCRIPTION

According to FIG. 1, a filter apparatus 1 according to the invention, which can for example be constructed as a fuel filter, as an oil filter or as a water separation filter for an internal combustion engine 2, has a solenoid valve 3, by means of which separated water 4 for example can be drained from a water collection chamber 5 of the filter apparatus 1 as required. To open and close the solenoid valve 3, a control apparatus 6 is provided in this case, which for example receives an appropriate signal of a water level sensor 14 for opening/closing. A similar water level sensor could of course also be provided in the region of a drainage apparatus 13, particularly in the region of a chamber 8. A non-return valve 7 is arranged downstream of the solenoid valve 3, wherein the non-return valve 7 and the solenoid valve 3 are connected to one another in a communicating manner via the chamber 8. Likewise provided is a pressure sensor 9, which is constructed for pressure sensing in the chamber 8 located between the solenoid valve 3 and the non-return valve 7. Furthermore, an adsorption filter 10, for example an activated carbon filter, can be provided downstream of the non-return valve 7, in which filter hydrocarbon portions still present in the separated water can be separated. A leak detection apparatus 11 is connected to the pressure sensor 9, which is additionally also constructed for analysing the signals generated by the pressure sensor 9.

A non-return valve 7 is arranged downstream of the solenoid valve 3, wherein a chamber 8 with a pressure sensor 9 is provided between the solenoid valve 3 and the non-return valve 7, wherein the pressure sensor 9 is constructed for pressure sensing in the chamber 8. An additional adsorption filter 10, particularly an activated carbon filter, can for example be arranged downstream of the non-return valve 7. Likewise provided is a leak detection apparatus 11, which is connected to the pressure sensor 9 and is constructed for analysing the signals thereof.

The leak detection apparatus 11 can also be connected to the pressure sensor 9 and the control apparatus 6 for opening and closing the solenoid valve. The solenoid valve 3, the chamber 8 and also the pressure sensor 9 and the non-return valve 7 can in this case be arranged in a housing 12 of the drainage apparatus 13, which is arranged separately from the filter apparatus 1.

The drainage apparatus 13 according to the invention or the filter apparatus 1 according to the invention in this case functions as follows:

Initially, the solenoid valve 3 is at least partially opened owing to an appropriate signal of the water level sensor 14 and therefore water 4 is drained from the water collection chamber 5 into the chamber 8. Opening the solenoid valve 3 via the control apparatus 6 in this case takes place exclusively, insofar as the water level sensor 14 in the water collection chamber 5 reports a sufficiently high water level and therefore a sufficiently large quantity of water present. The water level sensor 14 is in this case usually constructed as what is known as a 2-level sensor, which, upon reaching the upper level, transmits an opening signal and, when the water level drops to the lower level, transmits a closing signal to the control apparatus 6. As a result, it can be prevented that the incorrect fluid, for example fuel, is drained inadvertently. Since the non-return valve 7 continues to block in this case, a pressure increase occurs in the chamber 8, which is detected by the pressure sensor 9. If a pressure increase of this type is detected, then the leak detection apparatus 11 connected to the pressure sensor 9 does not generate a fault notification, as long as the solenoid valve 3 is open at the same time. If, by contrast, no pressure increase is detected, such a fault notification takes place. Subsequently, the solenoid valve 3 is closed and after the closing the solenoid valve 3, a pressure change is detected in the chamber 8 by the pressure sensor 9. Within a predetermined time period t, in this case, if there is a pressure increase or if the pressure in the chamber 8 stays the same, a fault notification is generated, as in this case it is to be assumed that the solenoid valve 3 no longer reliably and completely closes. Only in the case of a pressure drop, which is caused by a non-return-valve-specific desired leak, is no fault notification generated. The predetermined time period t is in this case approx. 0s to 60s.

It is advantageous in this case, if the chamber 8 between the solenoid valve 3 and the non-return valve 7 is small, the wall is ideally stiff and there are no spaces, in which air bubbles can remain. The leak in ml/min, which is required for reducing the pressure between the solenoid valve 3 and the non-return valve 7 within the time period t, in this case defines the lower limit of leak detection in ml/min. Larger leaks at the solenoid valve 3 in this case lead to a pressure increase in the chamber 8 and therefore likewise indicate a malfunction at the solenoid valve 3. If, after the closure of the solenoid valve 3 plus the predetermined time period t at the pressure sensor 9, a pressure in the order of magnitude of the opening pressure of the non-return valve 7 is still applied, this is a sign of a leak, wherein the leak detection apparatus 11, which can for example be part of a motor control, processes the signals transmitted by the pressure sensor 9 as follows:

If the solenoid valve 3 is closed, the time period t has passed and there is no pressure at the pressure sensor 9, then this is fine. If the solenoid valve 3 is closed however, and there is still a pressure applied at the pressure sensor 9 after the time period t, then this indicates a leak at the solenoid valve 3, wherein the leak detection apparatus 11 generates a fault notification.

During the time period t measurement is not carried out, wherein in the case of very precise measurement accuracy, a pressure drop can already be compared with a desired pressure drop. After the time period t, measurement can be carried out, wherein a continuous monitoring of the pressure is of course possible, wherein in this case, the measurement intervals are still to be determined. For example, measurement intervals of this type can be 0 to 60 s.

With the filter apparatus 1 according to the invention or the drainage apparatus 13 according to the invention and the associated method, the functionality or the closing function of the solenoid valve 3 can be monitored by means of the pressure sensor 9 in a simplified manner, wherein the hitherto required double valve construction can be dispensed with in particular. As a result, the entire valve construction becomes less expensive with nonetheless constant safety.

The invention claimed is:

1. A drainage apparatus for a filter device, comprising:
   a housing including a drainage duct extending from an inlet fluidly connected upstream of the housing and an outlet fluidly connected downstream of the housing;
   a solenoid valve arranged in the housing at the inlet;
   a non-return valve arranged downstream of the solenoid valve in the housing outlet, the non-return valve in fluid communication with the solenoid valve via a chamber of the drainage duct, wherein the non-return valve is configured to discharge fluid from the chamber,
   a pressure sensor in fluid communication with the chamber arranged between the solenoid valve and the non-return valve, the pressure sensor configured for pressure sensing in a chamber; and
   a control apparatus operably connected to the solenoid valve, wherein the control apparatus is configured to open and close the solenoid valve to convey fluid from the inlet to the chamber, but does not control the non-return valve for discharging fluid from the chamber downstream of the outlet.

2. The drainage apparatus according to claim 1, wherein the control apparatus controls the solenoid valve to open and close in response to signals output from a water level sensor, but does not control the non-return valve for discharging fluid downstream of the outlet in response to said signals output from the water level sensor during operation of the control apparatus.

3. The drainage apparatus according to claim 1, further comprising a leak detection apparatus connected to the pressure sensor and configured to detect a leak in response to signals received from the pressure sensor.

4. The drainage apparatus according to claim 3, wherein the leak detection apparatus is configured to output a fault notification if the pressure sensor does not detect a pressure increase when the solenoid valve is at least partially open.

5. The drainage apparatus according to claim 4, wherein, when the solenoid valve is closed, the leak detection apparatus is further configured to output a fault notification within a predetermined time period in response to said signals indicating at least one of a pressure increase and a constant pressure in the chamber.

6. The drainage apparatus according to claim 1, further comprising a leak detection apparatus connected to the pressure sensor and the control apparatus, wherein the leak detection apparatus monitors a pressure in the chamber via signals output from the pressure sensor and a position of the solenoid valve via signals output from the control apparatus, but does not monitor a position of the non-return valve during operation of the leak detection apparatus.

7. The drainage apparatus according to claim 6, wherein the leak detection apparatus is configured to detect a change of pressure in the chamber in response to signals received from the pressure sensor when the solenoid valve is closed, the leak detection apparatus further configured to output a fault notification within a predetermined time period when said signals indicate a pressure increase in the chamber and when said signals indicate a constant pressure in the chamber.

8. The drainage apparatus according to claim 7, wherein the leak detection apparatus is further configured to output a fault notification when the solenoid valve is at least partially open unless said signals indicate a pressure increase in the chamber.

9. The drainage apparatus according to claim 1, further comprising an adsorption filter in fluid communication with the non-return valve and arranged downstream of the non-return valve.

10. A filter apparatus for an internal combustion engine, comprising:
    a water collection chamber;
    a water level sensor arranged in the water collection chamber for detecting a fluid in the water collection chamber;
    a drainage apparatus arranged downstream from the water collection chamber, the drainage apparatus including:

a housing;

a solenoid valve disposed in the housing and in fluid communication with the water collection chamber;

a non-return valve arranged downstream of the solenoid valve, wherein the non-return valve is in the fluid communication with the solenoid valve via a chamber, and the non-return valve is fluidly connected on a downstream side with a drainage line to discharge fluid from the chamber and out of the housing;

a pressure sensor arranged between the solenoid valve and the non-return valve, wherein the pressure sensor is configured to detect a pressure in the chamber disposed between the solenoid valve and the non-return valve; and a control apparatus operably connected to the solenoid valve and the water level sensor for draining the fluid from the water collection chamber to the drainage line in response to signals output from the water level sensor, wherein the control apparatus controls the solenoid valve to open and close in response to said signals output from the water level sensor, but does not control the non-return valve in response to said signals;

a leak detection apparatus connected to the pressure sensor and the control apparatus, wherein the leak detection apparatus monitors the pressure in the chamber and a position of the solenoid valve to detect a leak in response to respective signals output from the pressure sensor and the control apparatus, but does not monitor a position of the non-return valve during operation of the leak detection apparatus.

11. The filter device according to claim 10, wherein the solenoid valve and the non-return valve are arranged in the housing, wherein the solenoid valve fluidly connects the chamber to the water collection chamber upstream of the housing and the non-return valve fluidly connects the chamber to the drainage line downstream of the housing.

12. The filter device according to claim 11, further comprising an activated carbon adsorption filter arranged downstream of the non-return valve, wherein the drainage line fluid connects the adsorption filter to the non-return valve.

13. The filter device according to claim 10, further comprising an adsorption filter arranged downstream of the non-return valve, wherein the drainage line fluidly connects the adsorption filter to the non-return valve.

14. The filter device according to claim 10, wherein the leak detection apparatus is configured to detect a leak in response to said signals received from the pressure sensor, and wherein the leak detection apparatus outputs a fault notification unless said signals indicate a pressure increase in the chamber when the solenoid valve is at least partially open.

15. The filter device according to claim 10, wherein the leak detection apparatus is configured to detect a change of pressure in the chamber in response to signals received from the pressure sensor when the solenoid valve is closed, the leak detection apparatus further configured to output a fault notification within a predetermined time period when said signals indicate a pressure increase in the chamber and when said signals indicate a constant pressure in the chamber.

16. A method for detecting a leak of a drainage apparatus, comprising:

monitoring signals output from a water level sensor in a water collection chamber;

controlling a solenoid valve to switch from a closed position to an at least partially opened position in response to said signals indicating a presence of fluid in the water collection chamber, wherein the solenoid valve is arranged upstream of a non-return valve, and wherein the solenoid valve is in fluid communication with the non-return valve via a chamber disposed between the solenoid valve and the non-return valve;

communicating a signal indicating a position of the solenoid valve to a leak detection apparatus;

monitoring signals of a pressure sensor for detecting a pressure in the chamber disposed between the solenoid valve and the non-return valve after controlling the solenoid valve to switch from the closed position to the at least partially opened position; and outputting a fault notification based on said signals of the pressure sensor unless said signals indicate a pressure increase and the solenoid valve is in the at least partially opened position;

wherein the leak detection apparatus monitors the position of the solenoid valve and the pressure in the chamber for outputting the fault notification but does not monitor a position of the non-return valve during operation of the leak detection apparatus.

17. The method according to claim 16, wherein after controlling the solenoid valve to the at least partially opened position and said signals indicated the pressure increase, further comprising:

controlling the solenoid valve to switch from the at least partially opened position to the closed position;

detecting a pressure change of the pressure in the chamber within a predetermined time period after controlling the solenoid valve into the closed position; and outputting a fault notification when the pressure change indicates a pressure increase in the chamber and when the pressure change indicates a constant pressure in the chamber, and wherein when the pressure change indicates a pressure drop in response to a non-return-valve-specific desired leak, no fault notification is output.

18. The method according to claim 16, wherein the solenoid valve is in fluid communication with a water collection chamber, and the non-return valve is in fluid communication with an adsorption filter.

19. The method according to claim 16, further comprising draining fluid from the water collection chamber by controlling the solenoid valve to open and close in response to said signals output from the water level sensor without controlling the non-return valve.

* * * * *